(12) United States Patent
Ohta et al.

(10) Patent No.: US 10,099,657 B2
(45) Date of Patent: Oct. 16, 2018

(54) WIPER BLADE AND WIPER

(71) Applicants: ASMO CO., LTD., Kosai-shi, Shizuoka-ken (JP); NIPPON WIPER BLADE CO., LTD., Kazo-shi, Saitama-ken (JP)

(72) Inventors: Isao Ohta, Kosai (JP); Takao Yoshimoto, Toyohashi (JP); Masahiro Ohta, Hamamatsu (JP)

(73) Assignees: Denso Corporation, Kariya (JP); Nippon Wiper Blades Co., Ltd., Saitama-ken (JP)

( * ) Notice: Subject to any disclaimer, the term of this patent is extended or adjusted under 35 U.S.C. 154(b) by 148 days.

(21) Appl. No.: 14/893,468

(22) PCT Filed: Jun. 11, 2014

(86) PCT No.: PCT/JP2014/065506
§ 371 (c)(1),
(2) Date: Nov. 23, 2015

(87) PCT Pub. No.: WO2015/033641
PCT Pub. Date: Mar. 12, 2015

(65) Prior Publication Data
US 2016/0264101 A1 Sep. 15, 2016

(30) Foreign Application Priority Data

Sep. 5, 2013 (JP) ................................. 2013-184131

(51) Int. Cl.
*B60S 1/40* (2006.01)
*B60S 1/34* (2006.01)
*B60S 1/38* (2006.01)

(52) U.S. Cl.
CPC .............. *B60S 1/4048* (2013.01); *B60S 1/34* (2013.01); *B60S 1/3849* (2013.01); *B60S 1/40* (2013.01);
(Continued)

(58) Field of Classification Search
CPC .. B60S 1/40; B60S 1/4048; B60S 1/34; B60S 1/4038; B60S 1/4041; B60S 1/4064; B60S 1/4051; B60S 1/4054
(Continued)

(56) References Cited

U.S. PATENT DOCUMENTS 6,654,983 B1   12/2003 Raynaud
2007/0214593 A1   9/2007 Boland
(Continued)

FOREIGN PATENT DOCUMENTS

CN   101151180 A   3/2008
CN   102149582 A   8/2011
(Continued)

OTHER PUBLICATIONS

International Preliminary Report on Patentability for International Application No. PCT/JP2014/065506, dated Mar. 8, 2016, 6 pages.
(Continued)

*Primary Examiner* — Monica Carter
*Assistant Examiner* — Katina Henson
(74) *Attorney, Agent, or Firm* — Patterson Thuente Pedersen, P.A.

(57) ABSTRACT

A wiper blade includes blade rubber, a holder body, and a clip. The clip is pivotally connected to the holder body. The clip has an elastic piece and an engagement protrusion. The engagement protrusion engages with an engagement hole provided in a wiper arm. The elastic piece section has a long piece section, a turned-back section, a first bending axis, and a second bending axis. The long piece section extends
(Continued)

through a position to a side of the engagement protrusion. The turned-back section extends so as to change the direction of the long piece section in order to connect the front end of the long piece section to the engagement protrusion. The first bending axis and the second bending axis extend so that the engagement protrusion is located between the first bending axis and the second bending axis.

11 Claims, 5 Drawing Sheets

(52) U.S. Cl.
CPC ............ *B60S 1/4038* (2013.01); *B60S 1/4041* (2013.01); *B60S 1/4045* (2013.01); *B60S 1/4064* (2013.01); *B60S 2001/4051* (2013.01); *B60S 2001/4054* (2013.01)

(58) Field of Classification Search
USPC .............................................. 15/105, 250.32
See application file for complete search history.

(56) References Cited

U.S. PATENT DOCUMENTS

2011/0247166 A1  10/2011  Depondt et al.
2012/0233801 A1   9/2012  Coart et al.

FOREIGN PATENT DOCUMENTS

| | | | |
|---|---|---|---|
| DE | 102011053090 A9 * | 5/2013 | ............ B60S 1/4048 |
| EP | 2371634 A1 | 10/2011 | |
| FR | 2781741 A1 | 2/2000 | |
| JP | 2002-522289 A | 7/2002 | |
| JP | 2008-509034 A | 3/2008 | |
| JP | 2013-504479 A | 2/2013 | |
| WO | WO 2013/030130 A1 | 3/2013 | |

OTHER PUBLICATIONS

PCT International Search Report for International Application No. PCT/JP2014065506, dated Sep. 16, 2014, 2 total pages.
Chinese Office Action for Application No. 201480031206.9, dated Mar. 30, 2017 and English Language Machine Translation (14 pgs. total).

* cited by examiner

Removal direction of wiper arm

Fig.8

Removal direction of wiper arm

WIPER BLADE AND WIPER

RELATED APPLICATIONS

The present application is a National Phase entry of PCT Application No. PCT/JP2014/065506, filed Jun. 11, 2014, which claims priority to JP 2013-1894131 filed Sep. 5, 2013, all said applications being hereby incorporated herein by reference in their entireties.

TECHNICAL FIELD

The present invention relates to a wiper blade and a wiper for a vehicle.

BACKGROUND ART

A conventional vehicle wiper includes a wiper arm and a wiper blade, which is coupled to the wiper arm. A coupling device arranged in a longitudinally middle portion of the wiper blade pivotally couples the wiper blade to the wiper arm. The coupling device includes a projection of a tongue, which can be pushed down. The projection is fitted into a hole of the wiper arm to couple the wiper blade to the wiper arm. For example, Patent Document 1 discloses a wiper that includes a tongue serving as a coupling device and having a hinge axis (flexing axis) in a portion of the tongue at a side of the projection located toward the removal direction of the wiper arm. The wiper blade of this wiper is not as easily separated from the wiper arm even when force in the removal direction of the wiper arm is applied to the projection of the tongue, as compared to a wiper that includes a tongue having a hinge axis in a portion of the tongue at a side of the projection located toward the direction opposite to the removal direction of the wiper arm (i.e., toward the direction in which the wiper arm is attached from the projection).

SUMMARY OF THE INVENTION

However, in the above configuration, when one pushes down the projection of the tongue, the projection pivots about the hinge axis (flexing axis). This inclines the projection. Thus, the projection cannot be easily removed from the hole of the wiper arm. This adversely affects the working efficiency.

It is an object of the present invention to provide a wiper blade and a wiper that are capable of improving the working efficiency for attaching and removing the wiper blade and the wiper.

To achieve the above object, a wiper blade according to one aspect of the present invention is coupled to a wiper arm. The wiper blade includes a rubber blade that wipes a wiping surface, a holder body that holds the rubber blade, and a coupling member. The coupling member is coupled to the holder body pivotally about an axis. The axis extends in a widthwise direction of the rubber blade. The coupling member includes an elastic piece and a locking projection, which is arranged in the coupling member and supported by the elastic piece. The locking projection is fitted into and engaged with a locking hole arranged in the wiper arm to couple the wiper blade to the wiper arm. The elastic piece includes a long piece, a reversed portion, a first flexing portion, and a second flexing portion. The long piece extends at a location beside the locking projection as viewed in a projecting direction of the locking projection. The reversed portion extends to change a direction of the long piece and connect a distal end of the long piece to the locking projection. The first flexing portion and the second flexing portion extend so that the locking projection is located between the first flexing portion and the second flexing portion.

EMBODIMENTS OF THE INVENTION

Figure 1:
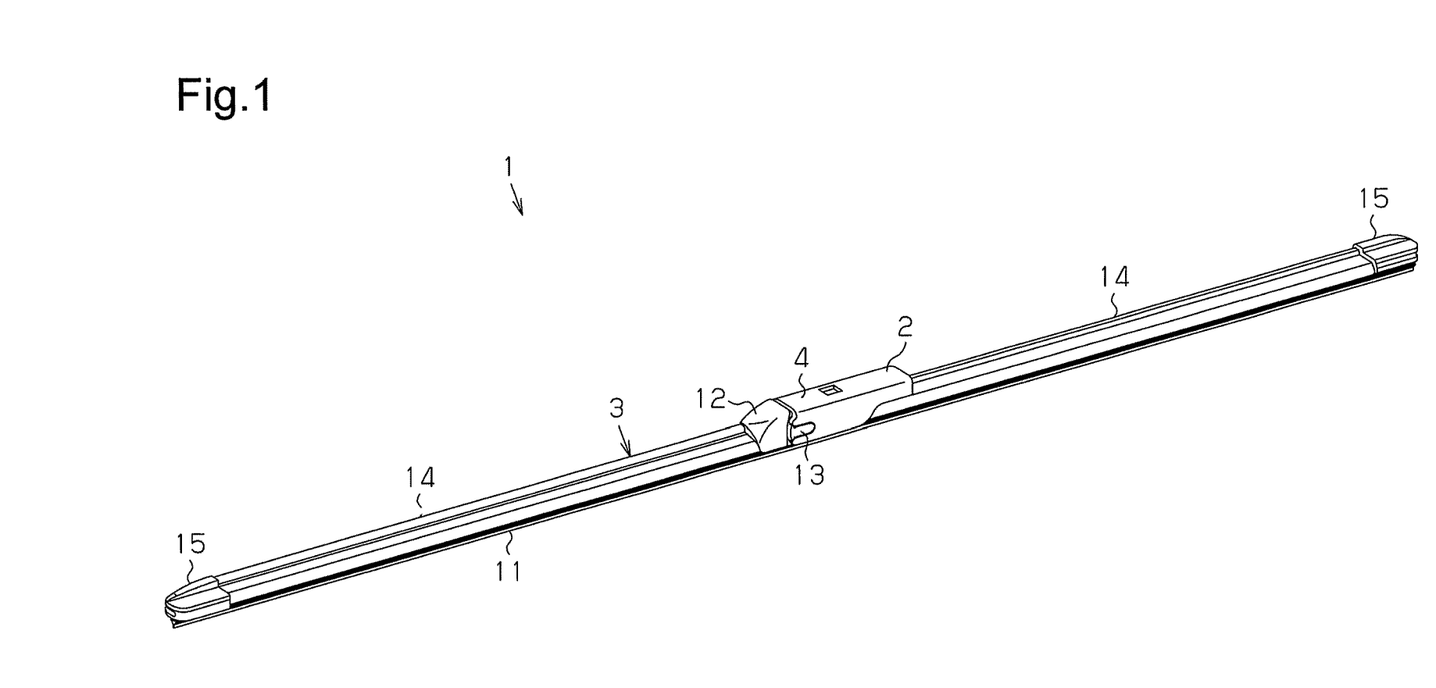
FIG. 1 is a perspective view showing a wiper according to one embodiment of the present invention.

One embodiment of a wiper for a vehicle will now be described with reference to FIGS. 1 to 8. Referring to FIG. 1, a vehicle wiper 1 wipes off rain or the like from a windshield, which serves as a wiping surface of an automobile. The wiper 1 includes a wiper arm 2 and a wiper blade 3, which is coupled to the wiper arm 2. FIG. 1 shows only a distal end portion of the wiper arm 2. A basal end portion of the wiper arm 2 is fixed to a pivot shaft (not shown), which is pivoted back and forth at a predetermined angle by the drive force of a wiper motor (not shown). The wiper arm 2 swings back and forth when the pivot shaft is pivoted back and forth. The wiper arm 2 includes a distal end coupling portion 4, which is biased toward the windshield (wiping surface) by a biasing mechanism (not shown). The wiper blade 3 is coupled to the distal end coupling portion 4 of the wiper arm 2.

As shown in FIGS. 2 to 5, the wiper blade 3 includes an elongated rubber blade 11, a holder body 12, and a clip 13. The rubber blade 11 wipes the wiping surface (windshield). The holder body 12 holds the rubber blade 11 and a backing (not shown), which includes an elongated longitudinally curve-shaped spring plate member. The clip 13, which serves as a coupling member, is coupled to the holder body 12 pivotally about an axis. The axis extends in the widthwise direction of the rubber blade 11.

The holder body 12 of the present embodiment is formed from a resin. The holder body 12 surrounds the upper part of a longitudinally middle portion of the rubber blade 11 and the backing to hold the rubber blade 11 and the backing. In the upper part of the rubber blade 11 and the backing, the two sides of the holder body 12 are respectively covered by two soft cases 14, and the two ends of the holder body 12 are each covered by a cap 15.

Figure 2:
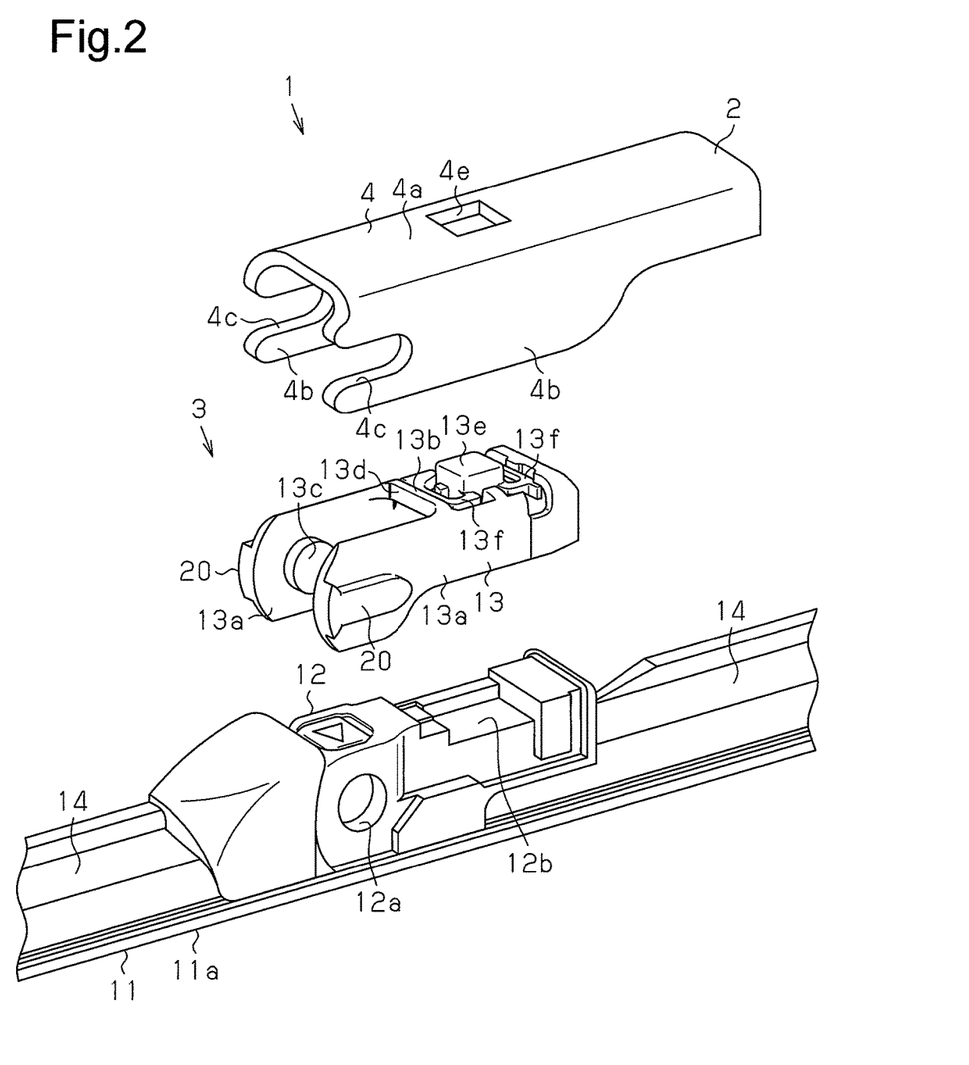
FIG. 2 is a partially exploded perspective view of the wiper shown in FIG. 1.

As shown in FIG. 2, the longitudinally middle portion of the holder body 12 includes shaft insertion holes 12a, which extend in the widthwise direction. A clearance groove 12b is formed in the upper surface of the holder body 12 at a basal side in the longitudinal direction (side closer to pivot shaft).

The clip 13 is formed from a resin. The clip 13 includes two side walls 13a, which extend along the two side surfaces of the holder body 12, and an upper wall 13b, which connects the upper ends of the two side walls 13a and extends along the upper surface of the holder body 12.

A support shaft 13c is formed on a distal inner surface of each of the two side walls 13a of the clip 13. The support shaft 13c pivotally supports the clip 13 relative to the holder body 12 when inserted into the corresponding shaft insertion hole 12a.

Figure 4:
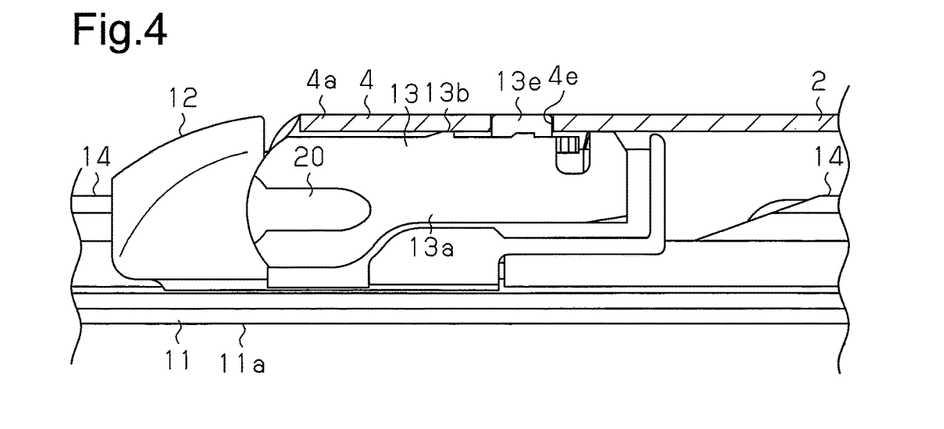
FIG. 4 is a partially cross-sectional side view of the wiper shown in FIG. 1.
Figure 5:
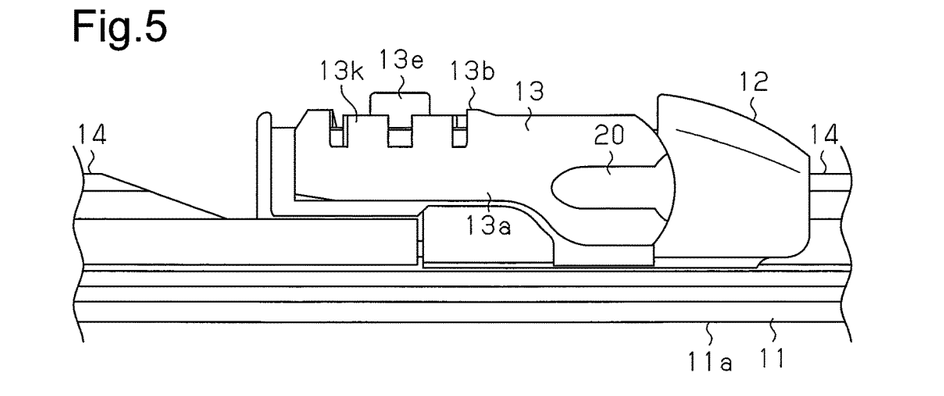
FIG. 5 is a partial side view of a wiper blade shown in FIG. 1.

A notch 13d is formed in a distal side of the upper wall 13b of the clip 13, that is, a portion closer to the support shaft 13c. The notch 13d allows the clip 13 to be pivoted. As shown in FIGS. 2, 4, and 5, an engagement projection 20 is formed on an outer surface of each side wall 13a of the clip 13. The engagement projection 20 projects toward the side opposite to the support shaft 13c, that is, toward the outer side in the widthwise direction of the wiper blade 3. The engagement projection 20 is elongated in the longitudinal direction at the vertically middle part of the side wall 13a.

As shown in FIG. 2, the clip 13 includes elastic pieces 13f and a locking projection 13e, which is supported by the elastic pieces 13f on the clip 13. The locking projection 13e projects upward and is fitted into a locking hole 4e (described below) of the wiper arm 2 for engagement in an attachment-removal direction of the wiper arm 2. The "attachment-removal direction of the wiper arm 2" corresponds to the longitudinal direction of the rubber blade 11 or the like. The locking projection 13e is configured so that it can be pushed down.

Figure 3:
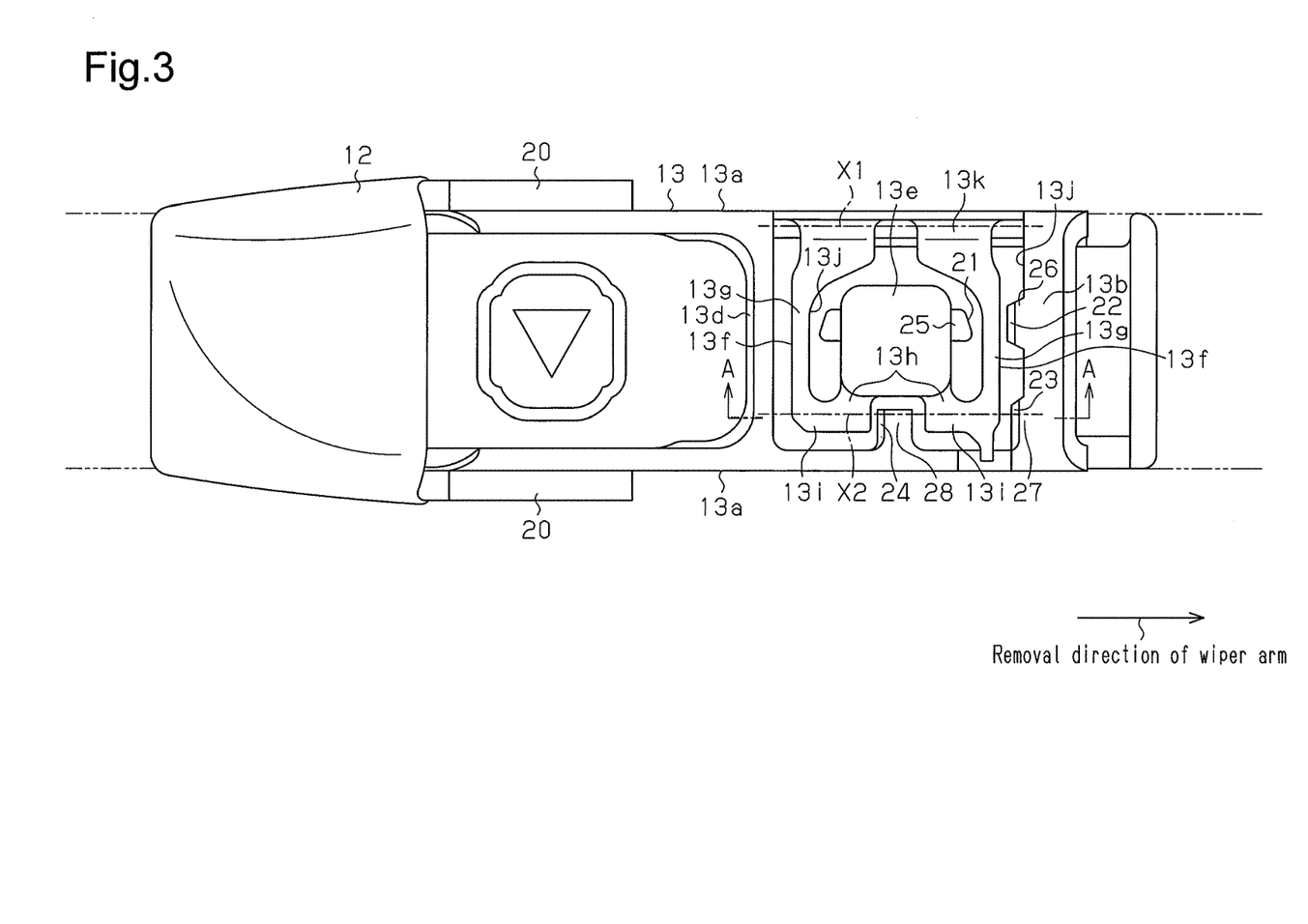
FIG. 3 is a plan view of a holder body and a clip shown in FIG. 1.

More specifically, as shown in FIG. 3, the locking projection 13e of the present embodiment substantially has the form of a regular square as viewed in the projecting direction. The phrase "as viewed in the projecting direction" means as viewed from above. In the present embodiment, each elastic piece 13f includes a long piece 13g, a reversed portion 13h, a first flexing axis X1 (first flexing portion), and a second flexing axis X2 (second flexing portion). The elastic piece 13f includes a flexing portion 13k, which is located at a border between the upper wall 13b and the side wall 13a. The long piece 13g extends at a location beside the locking projection 13e as viewed in the projecting direction of the locking projection 13e. The long piece 13g includes a basal end, which is connected to the side wall 13a, and a distal end, which is located at the opposite side of the basal end and serves as a free end. The reversed portion 13h changes the direction of the long piece 13g and extends to connect the distal end of the long piece 13g to the locking projection 13e. The first flexing axis X1 and the second flexing axis X2 extend so that the locking projection 13e is located between the first flexing axis X1 and the second flexing axis X2. The first flexing axis X1 is a flexing axis of the long piece 13g. The second flexing axis X2 is a flexing axis of the reversed portion 13h, which is paired with the first flexing axis X1. The flexing portion 13k functions as the first flexing axis X1.

The clip 13 of the present embodiment includes the two elastic pieces 13f, which have substantially the same form. The two elastic pieces 13f are arranged so that the locking projection 13e is located between the two elastic pieces 13f as viewed in the projecting direction of the locking projection 13e. That is, the two elastic pieces 13f are arranged at the two sides of the locking projection 13e in the attachment-removal direction of the wiper arm 2. The long pieces 13g extend in the widthwise direction, that is, extend from the first side wall 13a (upper side wall 13a in FIG. 3) toward the second side wall 13a (lower side wall 13a in FIG. 3). The "widthwise direction" differs from the attachment-removal direction of the wiper arm 2. Coupling portions 13i are formed in the distal ends of the long piece 13g as viewed in the projecting direction of the locking projection 13e. The coupling portions 13i extend toward each other. Each reversed portion 13h includes a basal end, which corresponds to the distal end of the corresponding coupling portion 13i, and a distal end, which slightly extends toward the basal side of the long piece 13g (toward one of the side walls 13a) and is connected to the locking projection 13e. The "basal side of the long piece 13g" corresponds to the portion of the long piece 13g that is closer to the first side wall 13a.

Figure 6A:
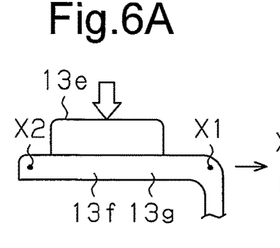
FIGS. 6A to 6C are schematic views each showing a locking projection of FIG. 2 when being pushed down.
Figure 6B:
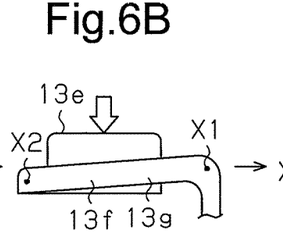
Figure 6C:
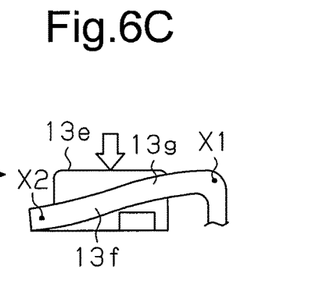

As shown in FIGS. 3 and 6, with respect to force that pushes down the locking projection 13e (refer to arrow in FIG. 6), an axis extending in the attachment-removal direction of the wiper arm 2 at the basal end of the long piece 13g serves as the first flexing axis X1. With respect to force that pushes down the locking projection 13e, an axis extending in the attachment-removal direction of the wiper arm 2 at the distal end of the long piece 13g serves as the second flexing axis X2. The "distal end of the long piece 13g" corresponds to the basal end of the coupling portion 13i or the reversed portion 13h. That is, when the locking projection 13e is pushed down, the elastic pieces 13f are each flexed and pivoted about the first flexing axis X1 and the second flexing axis X2 so that the locking projection 13e moves downward without being inclined. FIGS. 6A to 6C are schematic views sequentially showing the locking projection 13e being pushed down.

The locking projection 13e is formed at a location corresponding to the clearance groove 12b (refer to FIG. 2) of the holder body 12. The clearance groove 12b allows the locking projection 13e to be pushed down. In other words, the clearance groove 12b opposes the locking projection 13e to allow the locking projection 13e to be flexed and moved, that is, allows the locking projection 13e to be pushed down.

Figure 7:
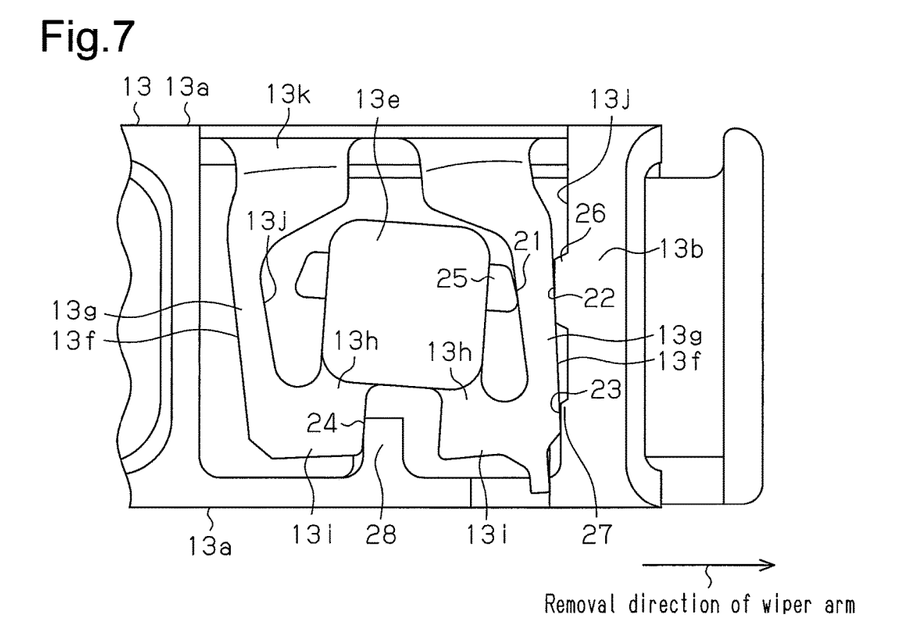
FIG. 7 is a schematic view showing when the locking projection of FIG. 2 receives force in a direction a wiper arm is removed.

As shown in FIGS. 3 and 7, the clip 13 includes first to fourth restriction portions 21 to 24. The first to fourth restriction portions 21 to 24 restrict movement of the locking projection 13e and the elastic pieces 13f in the removal direction of the wiper arm 2 (rightward direction in FIGS. 3 and 7).

More specifically, in the present embodiment, the locking projection 13e and the elastic pieces 13f are formed on the same plane as the upper wall 13b. A slit 13j separates the locking projection 13e from the elastic pieces 13f. The first to fourth restriction portions 21 to 24 are end surfaces that the locking projection 13e, the elastic pieces 13f, or the upper wall 13b contact when the locking projection 13e or the elastic pieces 13f moves in the removal direction of the wiper arm 2. The first to third restriction portions 21 to 23 are projections 25 to 27, each of which projects from a part of the slit 13j. More specifically, the first to third restriction portions 21 to 23 are distal ends of the projections 25 to 27. The first restriction portion 21 is a distal end surface of the projection 25, which projects in the removal direction of the wiper arm 2 (rightward direction in FIGS. 3 and 7), at a location corresponding to the end of the locking projection 13e farthest from the reversed portion 13h. As shown in FIG. 7, the first restriction portion 21 (distal end surface of projection 25) is inclined in a direction the first restriction portion 21 comes into linear contact with the elastic piece 13f, as viewed from above. The second restriction portion 22 is a distal end surface of the projection 26, which projects from the upper wall 13b toward the elastic piece 13f (long piece 13g) in the direction opposite to the removal direction of the wiper arm 2 (leftward direction in FIGS. 3 and 7), at a location corresponding to the end of the locking projection 13e farthest from the reversed portion 13h. The third restriction portion 23 is a distal end surface of the projection 27, which projects from the upper wall 13b toward the direction opposite to the removal direction of the wiper arm 2 (leftward direction in FIGS. 3 and 7), at a location corresponding to the distal portion of the long piece 13g. The fourth restriction portion 24 is a side surface of an extension 28, which extends from the upper wall 13b between the distal portions (coupling portions 13i) of the long pieces 13g, and is a side surface located at the side opposite to the removal direction of the wiper arm 2 (leftward direction in FIGS. 3 and 7).

More specifically, the first restriction portion 21 and the second restriction portion 22 are formed at a second location, and the third restriction portion 23 and the fourth restriction portion 24 are formed at a first location. The second location is a location in the clip 13 corresponding to the distal portion of the locking projection 13e. The distal portion of the locking projection 13e is located at the side of the locking projection 13e opposite to the basal portion. The basal portion of the locking projection 13e is where the locking projection 3e is connected to the reversed portion 13h. The first location is a location in the clip 13 corresponding to the distal portion of the long piece 13g, which includes the distal end of the long piece 13g.

Figure 8:
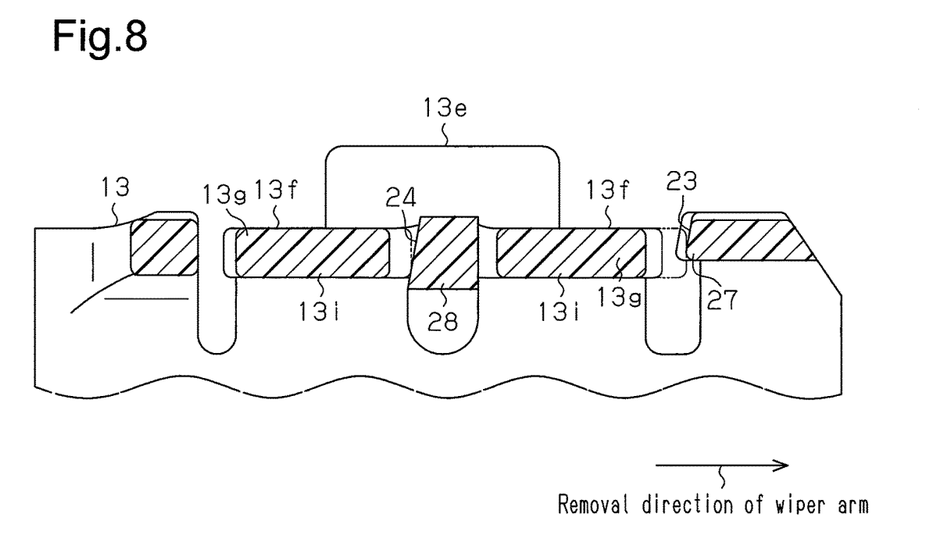
FIG. 8 is a cross-sectional view taken along line A-A in FIG. 3.

As shown in FIGS. 3 and 8, the second to fourth restriction portions 22 to 24 (FIG. 8 shows only third and fourth restriction portions 23 and 24) each have an inclined surface. Each inclined surface is inclined so that when the locking projection 13e or the elastic piece 13f receives force in the removal direction of the wiper arm 2, a component force acts on the locking projection 13e in the projecting direction (upward). That is, the second to fourth restriction portions 22 to 24 each have an inclined surface inclined upward relative to the removal direction of the wiper arm 2. The "inclined surface inclined upward relative to the removal direction of the wiper arm 2" corresponds to an inclined surface inclined relative to the removal direction of the wiper arm 2 in a direction the locking projection 13e acts to be fitted into the locking hole 4e. In FIG. 8, the broken lines show a situation in which the elastic pieces 13f (coupling portions 13i that are distal ends of long pieces 13g) contact the third and fourth restriction portions 23 and 24 when the locking projection 13e receives force in the removal direction of the wiper arm 2. The "situation in which the elastic pieces 13f contact the third and fourth restriction portions 23 and 24" corresponds to a situation in which the coupling portions 13i, which are the distal ends of the long pieces 13g, contact the third and fourth restriction portions 23 and 24.

In the above wiper blade 3, the clip 13 is coupled and fixed to the distal end coupling portion 4 of the wiper arm 2. As shown in FIG. 2, the distal end coupling portion 4 of the wiper arm 2 includes an upper cover wall 4a, which substantially covers the upper surface of the clip 13 (upper wall 13b), and two side cover walls 4b, which substantially cover the outer side surfaces of the clip 13 (two side walls 13a). Each side cover wall 4b includes an engagement recess 4c, which vertically engages the corresponding engagement projection 20 of the clip 13 when coupled to the clip 13 in the longitudinal direction. The engagement recesses 4c are formed so that the longitudinally distal side (one end side) opens at the vertically middle portions of the two side cover walls 4b. The engagement recesses 4c vertically engage the engagement projections 20 when the engagement projections 20 are inserted from the opening in the longitudinal direction and coupled to the engagement recesses 4c.

As shown in FIGS. 2 and 4, the upper cover wall 4a of the distal end coupling portion 4 includes the locking hole 4e, which is fitted into the locking projection 13e and engages the locking projection 13e in the attachment-removal direction when the locking hole 4e is coupled to the clip 13 (refer to FIG. 4) and when the locking projection 13e is not pushed down. This prevents relative movement of the distal end coupling portion 4 and the clip 13 in the longitudinal direction, that is, prevents separation of the wiper arm 2 and the wiper blade 3 as long as external force that pushes down the locking projection 13e is not applied.

The operation of the above wiper 1 will now be described. In the above wiper 1, one is able to attach the wiper blade 3 to the wiper arm 2 by relatively moving the clip 13 and the distal end coupling portion 4 of the wiper arm 2 in the longitudinal direction to insert the engagement projections 20 into the engagement recesses 4c while pushing down the locking projection 13e. One is also able to remove the wiper blade 3 from the wiper arm 2 by relatively moving the clip 13 and the distal end coupling portion 4 of the wiper arm 2 in the longitudinal direction to disengage the engagement projections 20 from the engagement recesses 4c while pushing down the locking projection 13e. In the coupled wiper 1, the wiper blade 3 is pivotal relative to the clip 13, which is fixed to the wiper arm 2 and the distal end coupling portion 4. When the distal end coupling portion 4 of the wiper arm 2 is biased toward the windshield (wiping surface) by a biasing mechanism (not shown), the biasing force is transmitted to the rubber blade 11 through the clip 13, the holder body 12, and the backing so that a wiping portion 11a, which is a lower end of the rubber blade 11, is pushed to contact the windshield (wiping surface) over the entire longitudinal length. Thus, a wiping operation is performed in a favorable manner when the wiper arm 2 is pivoted back and forth about the pivot shaft.

The above embodiment has the advantages described below.

(1) The elastic piece 13f includes the long piece 13g, the reversed portion 13h, the first flexing axis X1, and the second flexing axis X2. The first flexing axis X1 and the second flexing axis X2 extend so that the locking projection 13e is located between the first flexing axis X1 and the second flexing axis X2. Thus, the elastic piece 13f can be easily pushed down without inclining the locking projection 13e. More specifically, the amount in which the locking projection 13e is pushed down can be entirely increased as compared to when the locking projection 13e is inclined and pushed down like in prior art. Accordingly, for example, one can easily release the engagement with the locking hole 4e of the wiper arm 2 and improve the working efficiency when attaching and removing the wiper arm 2.

(2) The two elastic pieces 13f are arranged so that the locking projection 13e is located between the two elastic pieces 13f as viewed in the projecting direction of the locking projection 13e. This limits inclination that would occur when only one side is provided with the elastic piece 13f. Thus, one can easily release the engagement with the locking hole 4e of the wiper arm 2.

(3) The long pieces 13g extend in a direction that differs from the attachment-removal direction of the wiper arm 2. Thus, even when force acts in the removal direction of the wiper arm 2, the elastic pieces 13f are flexed in a direction that differs from the direction the locking projection 13e is pushed down. That is, the elastic pieces 13f resist flexing in a direction the locking projection 13e is disengaged from the locking hole 4e. This restricts unintended separation of the wiper arm 2 and the wiper blade 3 and reinforces the coupling of the wiper arm 2 and the wiper blade 3. Additionally, the clip 13 includes the first to fourth restriction portions 21 to 24. The first to fourth restriction portions 21 to 24 restrict movement of at least either one of the locking projection 13e and the elastic pieces 13f in the removal direction of the wiper arm 2. Thus, even when the locking projection 13e receives force in the removal direction of the wiper arm 2, further movement of the locking projection 13e or the elastic piece 13f from where the first to fourth restriction portions 21 to 24 contact is restricted in the removal direction of the wiper arm 2. More specifically, when the locking projection 13e receives force in the removal direction of the wiper arm 2, the elastic pieces 13f are deformed and the locking projection 13e acts to move in the removal direction. However, this force is received by the first to fourth restriction portions 21 to 24. This prevents flexing of the elastic pieces 13f in the pushing direction. Thus, the elastic pieces 13f can be easily flexed in the pushing direction and the locking projection 13e can be easily pushed down while reinforcing the coupling of the wiper arm 2 and the wiper blade 3. Accordingly, one can perform attachment and removal tasks more efficiently. In other words, the elastic pieces 13f can be easily flexed in the pushing direction so that one can easily push down the locking projection 13e. In such a case, if the first to fourth restriction portions 21 to 24 are not provided, the elastic pieces 13f may be greatly deformed thereby separating the wiper arm 2 and the wiper blade 3 when the locking projection 13e receives force in the removal direction of the wiper arm 2. In the present embodiment, such a situation can be avoided. Further, breakage of the elastic pieces 13f can be avoided.

(4) The locking projection 13e and the elastic pieces 13f are formed on the same plane as the upper wall 13b of the clip 13. The slit 13j separates the locking projection 13e from the elastic pieces 13f. The first to third restriction portions 21 to 23 are the projections 25 to 27, which project into the slit 13j at parts of the slit 13j. More specifically, the first to third restriction portions 21 to 23 are the distal end surfaces of the projections 25 to 27. Thus, integral molding of the projections 25 to 27 is facilitated just by setting the form of the slit 13j. Further, since the projections 25 to 27 are projected in parts of the slit 13j, the durability of the mold used for manufacturing can be improved while decreasing the width in which the projections 25 to 27 are movable in the restriction direction, that is, the flexing width. More specifically, when decreasing the width of the entire slit in a direction in which the slit extends to decrease the movable width in the restriction direction of the locking projection 13e and the elastic pieces 13f, the mold used for manufacturing would include long thin portions. Thus, the mold may be easily damaged. However, the present embodiment limits such damage. When the movable width in the restriction direction of the locking projection 13e and the elastic pieces 13f is reduced, the amount of flexing of the elastic pieces 13f is reduced in the restriction direction. This also reduces the stress applied to the elastic pieces 13f and contributes to preventing damage. The "amount of flexing in the restriction direction of the elastic pieces 13f" corresponds to the amount of deformation in the restriction direction of the elastic pieces 13f.

(5) The first to fourth restriction portions 21 to 24 are formed at the first location and the second location. The first location is a location in the clip 13 corresponding to the distal portions of the long pieces 13g, which include the distal end of the long piece 13g. The second location is a location in the clip 13 corresponding to the distal portion of the locking projection 13e. The distal portion of the locking projection 13e is located at the side of the locking projection 13e opposite to the basal portion. The basal portion of the locking projection 13e is a portion of the locking projection 13e where the reversed portion 13h is connected. Thus, even when a relatively large slit width is set, the movable width in the restriction direction of the locking projection 13e and the elastic pieces 13f can be minimized. More specifically, the distal portions of the long pieces 13g and the distal portions of the locking projection 13e sway most greatly in the restriction direction from the flexing axis X1 or X2 when the locking projection 13e receives force in the removal direction of the wiper arm 2. Accordingly, as compared to when the first to fourth restriction portions 21 to 24 are formed in other portions, the movement range of the locking projection 13e and the elastic pieces 13f when force is applied can be minimized even if a relatively large slit width is set.

(6) The second to fourth restriction projections 22 to 24 each have an inclined surface. The inclined surface is inclined to generate a component force in the projecting direction (upward) of the locking projection 13e when at least either one of the locking projection 13e and the elastic piece 13f receives force in the removal direction of the wiper arm 2. Thus, when force is applied in the removal direction of the wiper arm 2, a component force acts on the inclined surface in a direction the locking projection 13e is further fitted into the locking hole 4e. This limits disengagement of the locking projection 13e from the locking hole 4e.

The above embodiment may be modified as follows. In the above embodiment, the two elastic pieces 13f are arranged so that the locking projection 13e is located between the two elastic pieces 13f as viewed in the projecting direction of the locking projection 13e. Instead, there may be only one elastic piece.

In the above embodiment, the long piece 13g of each elastic piece 13f extends in a direction that differs from the attachment-removal direction of the wiper arm 2, that is, in the widthwise direction of the clip 13. Instead, the long piece 13g may be formed to extend in another direction.

In the above embodiment, the slit 13j separates the locking projection 13e from the elastic pieces 13f, and the locking projection 13e and the elastic pieces 13f are formed on the same plane of the upper wall 13b of the clip 13. Instead, for example, the locking projection 13e and the elastic pieces 13f may be formed on the same plane as the side wall 13a.

In the above embodiment, the first to third restriction portions 21 to 23 are the projections 25 to 27 that project into parts of the slit 13j. For example, the opposing end surfaces may entirely function as restriction portions instead of forming the projections 25 to 27.

In the above embodiment, the first to fourth restriction portions 21 to 24 are formed in the first location and the second location. The first location is a location in the clip 13 corresponding to the distal portion of each long piece 13g, which includes the distal end of the long piece 13g. The second location is a location in the clip 13 corresponding to the distal portion of the locking projection 13e. The distal portion of the locking projection 13e is located at the side of the locking projection 13e opposite to the basal portion. The basal portion of the locking projection 13e is a portion of the locking projection 3e where the reversed portion 13h is connected. Instead, the restriction portions may be arranged at locations other than the first and second locations.

In the above embodiment, the second to fourth restriction portions 22 to 24 each have an inclined surface. The inclined surface is inclined to generate a component force at the locking projection 13e in the projecting direction (upward) when at least either one of the locking projection 13e and the elastic pieces 13f receives force in the removal direction of the wiper arm 2. Instead, the inclined surface does not have to generate the component force. Further, the clip 13 may include opposing portions that oppose the second to fourth restriction portions 22 to 24. The opposing portions may include inclined surfaces that generate component forces in the same manner as the above configuration.

In the above embodiment, the holder body 12 directly holds the rubber blade 11. Instead, the holder body may indirectly hold the rubber blade.

The invention claimed is:

1. A wiper blade coupled to a wiper arm, the wiper blade comprising:
    a rubber blade that wipes a wiping surface;
    a holder body that holds the rubber blade; and
    a coupling member coupled to the holder body pivotally about an axis, wherein the axis extends in a widthwise direction of the rubber blade, and the coupling member includes an elastic piece, a locking projection, which is arranged in the coupling member and supported by the elastic piece, an upper wall, and first and second side walls, which extend downward from two end portions in the widthwise direction of the upper wall, wherein:
    the locking projection is fitted into and engaged with a locking hole arranged in the wiper arm to couple the wiper blade to the wiper arm;
    the elastic piece includes a long piece, a reversed portion, a first flexing portion, and a second flexing portion;
    the long piece includes a basal end portion, which is connected to the first side wall, and a distal end, which is located at the opposite side of the basal end portion and serves as a free end, wherein the long piece extends at a location beside the locking projection from the first side wall toward the second wall as viewed in a projecting direction of the locking projection;
    the reversed portion extends from the distal end of the long piece and turns back toward the basal end portion of the long piece so that a distal end of the reversed portion is connected to the locking projection;
    the first flexing portion includes a first flexing axis that extends through the basal end portion of the long piece along a longitudinal direction of the rubber blade;
    the second flexing portion includes a second flexing axis that extends through a distal portion including the distal end of the long piece along the longitudinal direction of the rubber blade; and
    the locking projection is located between the first flexing axis and the second flexing axis.

2. The wiper blade according to claim 1, wherein:
    the elastic piece is one of two elastic pieces; and
    the two elastic pieces extend in the widthwise direction so that the locking projection is located between the two elastic pieces in the longitudinal direction of the rubber blade as viewed in the projecting direction of the locking projection.

3. The wiper blade according to claim 1, wherein the long piece extends in a direction that differs from an attachment-removal direction of the wiper arm.

4. The wiper blade according to claim 3, wherein:
    the coupling member further includes a restriction portion; and
    the restriction portion restricts movement of at least one of the locking projection and the elastic piece in a removal direction of the wiper arm.

5. The wiper blade according to claim 4, wherein:
    the locking projection and the elastic piece are formed on the same surface as at least one of the upper wall, the first side wall, and the second side wall;
    a slit separates the locking projection from the elastic piece; and
    the restriction portion is a projection that projects into part of the slit.

6. The wiper blade according to claim 4, wherein:
    the restriction portion is formed at a first location and a second location;
    the first location is a location in the coupling member corresponding to the distal portion of the long piece; and
    the second location is a location in the coupling member corresponding to a distal portion of the locking projection, wherein the distal portion of the locking projection is located at a side opposite to a basal end portion of the locking projection, and the basal portion of the locking projection is a portion of the locking projection where the reversed portion is connected.

7. The wiper blade according to claim 4, wherein:
    the coupling member further includes an opposing portion that opposes the restriction portion;
    at least one of the restriction portion and the opposing portion includes an inclined surface; and
    the inclined surface is inclined to generate a component force in the projecting direction of the locking projection when at least one of the locking projection and the elastic piece receives force in the removal direction of the wiper arm.

8. The wiper blade according to claim 1, wherein:
    the first flexing axis is a flexing axis of the long piece; and
    the second flexing axis is a flexing axis of the reversed portion, which is paired with the first flexing axis.

9. The wiper blade according to claim 1, wherein:
    the elastic piece includes a flexing portion, which is flexed at a border between the upper wall and the side wall of the coupling member.

10. A wiper comprising:
    the wiper blade according to claim 1; and
    the wiper arm.

11. The wiper blade according to claim 1, wherein:
    when the locking projection is pushed down, the elastic piece is flexed and pivoted about the first flexing axis and the second flexing axis so that the locking projection moves downward without being inclined.

* * * * *